(12) United States Patent
Siohan et al.

(10) Patent No.: US 8,743,978 B2
(45) Date of Patent: Jun. 3, 2014

(54) METHODS FOR TRANSMITTING AND RECEIVING A MULTICARRIER SIGNAL COMPRISING A GUARD INTERVAL, CORRESPONDING COMPUTER PROGRAM PRODUCTS, TRANSMITTING AND RECEIVING DEVICES, AND SIGNAL

(75) Inventors: Pierre Siohan, Rennes (FR); Hao Lin, Rennes (FR); Chrislin Lele, Aubiere Cedex (FR)

(73) Assignee: France Telecom, Paris (FR)

( * ) Notice: Subject to any disclaimer, the term of this patent is extended or adjusted under 35 U.S.C. 154(b) by 792 days.

(21) Appl. No.: 12/920,206

(22) PCT Filed: Feb. 23, 2009

(86) PCT No.: PCT/FR2009/050286
§ 371 (c)(1),
(2), (4) Date: Jan. 6, 2011

(87) PCT Pub. No.: WO2009/112748
PCT Pub. Date: Sep. 17, 2009

(65) Prior Publication Data
US 2011/0110458 A1   May 12, 2011

(30) Foreign Application Priority Data
Feb. 29, 2008 (FR) ..................... 08 51316

(51) Int. Cl.
*H04L 27/28* (2006.01)
(52) U.S. Cl.
USPC ........................................ 375/260
(58) Field of Classification Search
USPC ........................................ 375/260
See application file for complete search history.

(56) References Cited

U.S. PATENT DOCUMENTS

2007/0258528 A1* 11/2007 Kwun et al. ............... 375/260
2008/0198946 A1*  8/2008 Lee et al. .................. 375/299
2008/0316912 A1* 12/2008 Al Adnani ................ 370/210
2009/0190675 A1*  7/2009 Ling et al. ................ 375/260

FOREIGN PATENT DOCUMENTS

WO   2008007019 A2   1/2008
WO   2008007030 A2   1/2008

OTHER PUBLICATIONS

International Search Report dated Jul. 20, 2009 for corresponding International Application No. PCT/FR2009/050286, filed Feb. 23, 2009.
Siala M. et al., "Prototype Waveform Optimization for an OFDM/OQAM System with Hexagonal Time-Frequency Lattice Structure" Signal Processing and Its Applications 2007 ISSPA 2007 9th International Symposium on, IEEE, Piscataway, NJ, USA, pp. 1-14.
French Search Report dated Nov. 28, 2008 for corresponding French Application No. 0851316, filed Feb. 29, 2008.
International Preliminary Report on Patentability and Written Opinion dated Sep. 28, 2010 for corresponding International Application No. PCT/FR2009/050286, filed Feb. 23, 2009.

* cited by examiner

*Primary Examiner* — Kevin Kim
(74) *Attorney, Agent, or Firm* — David D. Brush; Westman, Champlin & Koehler, P.A.

(57) ABSTRACT

A method is provided for transmitting a multiple-carrier signal. The method includes modulating data symbols representative of a data signal to be transmitted, which includes a filtering by at least one prototype function using at least two different filtering coefficients, thus providing a modulated signal including a time sequence of multiple-carrier symbols. A hold interval is inserted in front of at least one multiple-carrier symbol of the modulated signal, thus providing the multiple-carrier signal.

12 Claims, 3 Drawing Sheets

METHODS FOR TRANSMITTING AND RECEIVING A MULTICARRIER SIGNAL COMPRISING A GUARD INTERVAL, CORRESPONDING COMPUTER PROGRAM PRODUCTS, TRANSMITTING AND RECEIVING DEVICES, AND SIGNAL

CROSS-REFERENCE TO RELATED APPLICATIONS

This Application is a Section 371 National Stage Application of International Application No. PCT/FR2009/050286, filed Feb. 23, 2009 and published as WO 2009/112748 on Sep. 17, 2009, not in English.

STATEMENT REGARDING FEDERALLY SPONSORED RESEARCH OR DEVELOPMENT

None.

THE NAMES OF PARTIES TO A JOINT RESEARCH AGREEMENT

None.

FIELD OF THE DISCLOSURE

The field of the disclosure is that of wired or wireless telecommunications.

More specifically, the disclosure deals with transmitting and receiving signals that have undergone a multicarrier modulation.

In particular, the technique of the disclosure is well suited to the modulation and demodulation of oversampled OFDM (for Oversampled Orthogonal Frequency Division Multiplexing) signals or OFDM/OQAM (OFDM/offset quadrature amplitude modulation) signals, for which the carriers are shaped by a prototype function.

The disclosure can be applied especially in the field of terrestrial digital video broadcasting according to the DVB-T or DVB-T2 (Digital Video Broadcasting-Terrestrial) standard.

BACKGROUND OF THE DISCLOSURE

Systems known as "advanced" modulation systems such as the OFDM/OQAM, BFDM/OQAM, oversampled OFDM or else oversampled BFDM have numerous advantages over classic OFDM modulations.

First of all, these modulations have been designed to limit inter-symbol interference without the use of a guard interval in the time domain. These modulations therefore prevent any loss in spectral efficiency due to the introduction of a guard interval in OFDM.

Furthermore, these modulations allow introducing a waveform optimized with the appropriate criteria for a given transmission channel. In fact, the rectangular shaping of a signal done by classic OFDM modulation has the drawback of poor frequency localization.

Alternative solutions have therefore been proposed, leading to multiple-carrier modulation systems in which the signal is shaped by functions known as prototype functions that give better frequency localization.

Here below, a description is provided of the prior art pertaining to OFDM/OQAM (Offset Quadrature Amplitude Modulation) type modulations in which a QAM quadrature modulation implemented on each of the carriers is replaced by a modulation that offsets the real and imaginary parts of the complex symbols to be transmitted by a half symbol time for two successive carrier frequencies.

More specifically, FIG. 1 illustrates the main steps implemented for the OFDM/OQAM modulation according to the prior art.

As illustrated with reference to FIG. 1, the modulation scheme comprises data symbols at input representing a data signal to be transmitted. These data symbols denoted as $a_{m,n}$, carry a real value and are derived, at the symbol instant n and for the sub-carrier m, from usual preliminary operations not shown in FIG. 1.

These preliminary operations comprise the conversion of initial information data in binary form into data symbols. For example, in the case of a non-encoded system, a conversion known as a "binary to q-ary" conversion is performed. In the case of a $2^{2K}$-state square constellation QAM (Quadrature Amplitude Modulation), where each state corresponds to a complex value, this conversion is a "binary to 2K-ary" type conversion. Then, as in the context of an OFDM/OQAM transmission, the real and imaginary parts are processed separately, and this amounts to having a one-dimensional K-state constellation where each possible state corresponds to a real value. In other words, the data symbols $a_{m,n}$ are the result of a binary to K-ary PAM (Pulse Amplitude Modulation) type conversion.

These data symbols can correspond to payload data or to pilot data used for the channel estimation. When these pilots are inserted into the OFDM/OQAM signal in the form of an introduction, they are transmitted temporally before the payload data. For a channel that varies swiftly in time, these pilots are inserted permanently into the frame at temporal and frequency positions known to the sender and to the receiver.

In the case of OFDM/OQAM, the data symbols $a_{m,n}$ undergo a pre-modulation 11. This pre-modulation step includes a complex multiplication operation on each subcarrier which makes it possible to take into account a phase term specific to the "QAM-2K to PAM-K" conversion as well as the length of the prototype filter.

The data symbols output from the pre-modulation block 11 are then converted from the frequency domain into the time domain by means of an inverse Fourier transform, also called IFFT 12.

The polyphase filtering operation 13 which follows the IFFT operation 12 corresponds to the application of the prototype filter in its form known as the polyphase form.

After a parallel/series conversion 14, at output of the modulator, the OFDM/OQAM signal denoted as s[k] is obtained in a discrete form, or s(t) in a continuous form after passing through a digital/analog converter 15.

More specifically, the OFDM/OQAM signal can be represented, in baseband, in the following form:

$$s(t) = \sum_{n} \sum_{m=0}^{M-1} a_{m,n} \underbrace{g(t-n\tau_0)e^{j2\pi m v_0 t} e^{j\phi_{m,n}}}_{g_{m,n}(t)},$$

with:
$a_{m,n}$ being the real-value data symbols to be transmitted on a sub-carrier m at the instant n;
M the number of carrier frequencies;
g the prototype function utilized by the modulator;

$$\tau_0 = \frac{1}{2}T_0,$$

with $T_0$ the duration of a multicarrier signal at output of the modulator;

$v_0$ the spacing between two adjacent subcarriers of the multiplex;

$\phi_{m,n}$ a phase term chosen so as to achieve a real part/imaginary part alternation enabling orthogonality or more generally bi-orthogonality.

It can be noted that the steps implemented by the over-sampled OFDM modulation are similar: pre-modulation 11, inverse Fourier transform 12, polyphase filtering 13, parallel/series conversion 14, and digital/analog conversion 15. However, the oversampled OFDM modulation scheme comprises data symbols at input denoted as $c_{m,n}$, having a complex value. For example, these data symbols result directly from a "binary to 2K-ary" conversion.

Thus, the advanced modulations are used to achieve the desired conditions of orthogonality with prototype filters that are not necessarily rectangular, for example the IOTA (Isotropic Orthogonal Transform Algorithm) function. These modulation families thus offer a choice of prototype functions g wider than the simple rectangular prototype function of an OFDM modulation.

Thus, if the waveform g is chosen so as to meet the conditions of orthogonality known as real conditions, the real data symbols $a_{m,n}$ transmitted by the OFDM/OQAM on a perfect channel are perfectly retrieved after demodulation, i.e. $\hat{a}_{m,n} = a_{m,n}$.

In the case of a transmission on a frequency-selective and time-selective channel, and for an appropriate size of the OFDM/OQAM system, if the function g is properly localized in time and frequency, one obtains $\hat{a}_{m,n} \approx a_{m,n}$, assuming the application of a channel estimation technique that takes into account the specific nature of the orthogonality known as real orthogonality.

One drawback of these OFDM/OQAM type modulations is that the condition of orthogonality (or biorthogonality) is achieved only for real values of data symbols to be transmitted, creating a problem of estimation at reception and especially estimation of the transmission channel inasmuch as the received symbols are complex symbols.

More specifically, at reception, the OFDM/OQAM signal demodulated as $(m_0, n_0)$ is obtained by $y_{m_0,n_0}^{(c)} = \langle y | g_{m_0,n_0} \rangle$, such that:

$$y_{m_0,n_0}^{(c)} = H_{m_0,n_0}^{(c)} a_{m_0,n_0} + \underbrace{\sum_{(p,q) \neq (0,0)} a_{m_0+p,n_0+q} H_{m_0,n_0}^{(c)} \langle g \rangle_{m_0+p,n_0+q}^{m_0,n_0} + D_{m_0,n_0}}_{C_{m_0,n_0}} + b_{m_0,n_0}$$

where: $\langle g \rangle_{m_0+p,n_0+q}^{m_0,n_0}$ corresponds to a coefficient directly related to the ambiguity function of g, $C_{m_0,n_0}$ is the interference term corresponding to the domain in which the channel is supposed to be constant;

$D_{m_0,n_0}$ is the interference term corresponding to the domain in which the channel is different;

$b_{m_0,n_0}$ is the additive noise.

For a low signal-to-noise ratio (SNR<30 dB), the interference term $D_{m_0,n_0}$ can be overlooked inasmuch as the noise is predominant. However, for a high SNR, the interference term $D_{m_0,n_0}$ becomes predominant, giving rise to the presence of a very high SNR error level.

Furthermore, the presence of an imaginary interference term at reception prevents the use of classic space/time encoding schemes increasing robustness in transmission.

SUMMARY

The disclosure proposes a novel solution without all the drawbacks of the prior art in the form of a transmission method for transmitting a multicarrier signal implementing a step for modulating data symbols representing a data signal to be transmitted. This modulation step comprises a filtering by at least one prototype function implementing at least two distinct filtering coefficients, delivering a modulated signal constituted by a temporal succession of multicarrier symbols.

According to the disclosure, such a method comprises a step for inserting a guard interval before at least one multicarrier symbol of said modulated signal, delivering said multicarrier signal.

Thus, the disclosure proposes a new technique of transmission according to which at least one guard interval in time is added to a multicarrier signal, modulated according to a modulation technique known as an "advanced" technique, distinct from the classic OFDM.

For example, the modulation implemented is an OFDM/OQAM, BFDM/OQAM, oversampled OFDM, oversampled BFDM, FMT (Filter Multitone), and other type of modulation.

A modulation step of this kind comprises a polyphase filtering step corresponding to the application of at least one prototype filter in its form known as a polyphase form implementing at least two distinct filtering coefficients. Thus, the prototype function is different from the rectangular function conventionally used for classic OFDM modulations for which all the filtering coefficients are identical.

Owing to the use of a prototype function having a duration that could be greater than the symbol time of a data symbol, the multicarrier signals of the modulating signal can at least partially overlap one another. In other words, the multicarrier symbols are generally not independent in terms of time slots.

The advanced modulations used according to the disclosure such as OFDM/OQAM or the BDFM/OQAM especially have been designed to prevent the loss of spectral efficiency due to the introduction of a guard interval in time. These advanced modulations therefore have the main advantage of removing the need for a guard interval, and therefore preventing the loss in spectral efficiency caused by the introduction of an OFDM guard interval.

There is therefore no reason whatsoever to add an element, that the literature dceems to be a drawback, to these advanced modulation techniques since these techniques have been designed precisely to overcome the need for a guard interval.

According to one particular aspect of the disclosure, the guard interval inserted before at least one of the multicarrier symbols has a length smaller than or equal to the delay spread in the transmission channel of the multicarrier signal.

Thus, the guard interval of the disclosure differs from the classic guard interval inserted for the classic OFDM modulations.

Indeed, in classic OFDM, the guard interval is supposed to have a length greater than the value of the maximum delay appearing in the channel so that the interference may be eliminated. Thus, a guard interval with a length that can go up to ¼ of the duration of the multicarrier symbol is considered.

However, according to the disclosure, the guard interval inserted before at least one of the multicarrier symbols may have a length smaller than or equal to the greatest delay appearing in the channel. For example, the guard interval may have a length equal to only ⅒ of the duration of the multi-carrier symbol.

According to one particular embodiment, the multicarrier symbols comprise preamble symbols constituted by pilots whose value and/or location at sending are known to at least one receiver that is to make reception of said multicarrier signal, and payload symbols. The insertion step then inserts a guard interval solely before at least one of the payload symbols.

It may be recalled that a multicarrier symbol is formed by a set of subcarriers each modulating a data symbol (with a complex value for an oversampled OFDM modulation or oversampled BFDM modulation or with a real value for an OFDM/OQAM modulation or BFDM/OQAM modulation) on a symbol time. At output of the modulator, a multicarrier symbol corresponds therefore to the sum of the modulated data symbols.

These data symbols can be payload data or reference data, also called pilots.

Thus, the preamble (multicarrier) symbols comprise pilots only whereas the payload (multicarrier) symbols comprise payload data and possibly pilots when pilots are distributed in the time/frequency plane.

For example, the modulated symbol is considered to be organized in frames, each frame comprising preamble symbols, for example three consecutive multicarrier symbols) and payload symbols. According to this embodiment of the disclosure, a guard interval is inserted solely before the payload symbols. In other words, no guard interval is inserted before the preamble symbols. Thus, a frame of the multicarrier signal according to this example is formed by three preamble symbols, a guard interval, a payload symbol, a guard interval, a payload symbol etc., a payload symbol.

In addition, the prototype function used may be different for the preamble symbols and the payload symbols. For example, the prototype function used to implement the preamble symbols, may be the OptLoc function, which is a function optimized according to the time/frequency localization criterion. Indeed, this waveform is of interest for channel estimation. By contrast, the prototype function used for shaping the payload symbols (and therefore the data transmission) may be the IOTA function.

In particular, the preamble symbols are transmitted prior to the guard interval and to the payload symbols.

For example, the payload symbols are transmitted at a first instant and then the payload symbols accompanied by the guard intervals are transmitted at a second instant.

According to one variant, the transmission method implements at least two transmitting antennas and the step for inserting a guard interval is implemented for each of the transmitting antennas.

Thus, the disclosure can also be applied in multi-antenna systems implementing several transmitting antennas.

In this case, the method of transmission according to the disclosure comprises a step of space/time encoding applied to said modulated signal. An encoding of this kind can be used especially to increase transmission robustness.

For example, the space/time encoding step implements an encoding matrix based on an Alamouti type encoding scheme, such that:

$$S = \begin{bmatrix} s_1 & s_2 \\ s_1' & s_2' \end{bmatrix}$$

where: $s_1$ and $s_2$ are symbol vectors corresponding to the temporal samples transmitted at the instant t on a first transmission antenna and second transmission antenna respectively;
$s_1'$ and $s_2'$ are the symbol vectors corresponding to the temporal samples transmitted at the instant $t+T_0$ on the first and last transmitting antennas respectively, with:
  $s_1'[k]=s_2*[M-1-k]$;
  $s_2'[k]=-s_1*[M-1-k]$;
  M is the number of carriers of a multicarrier symbol of the multicarrier signal;
  $T_0$ is the duration of a multicarrier symbol of the multicarrier signal ($T_0=2\tau_0$);
  k is the index of the temporal sample; and
  * is the conjugate transpose operator.

Another embodiment of the disclosure relates to a device for transmitting a multicarrier signal comprising means for modulating data symbols representing a data signal to be transmitted. These modulating means implement a filtering by at least one prototype function implementing at least two distinct filtering coefficients, delivering a modulated signal constituted by a temporal succession of multicarrier symbols.

According to the disclosure, such a device comprises means for inserting a guard interval before at least one multicarrier symbol of said modulated signal, delivering said multicarrier signal.

Such a transmitting device is adapted especially to implementing the method of transmission described here above. It is for example a base station or a transmitter of a DVB-T or DVB-T2 terrestrial digital video broadcasting network. In particular, such a transmitter can work in a SFN («Single Frequency Network») broadcasting mode. This means that the different transmitters must be synchronized in time and in frequency.

The disclosure also relates to a method for receiving a multicarrier signal formed by a temporal succession of multicarrier symbols, at least one multicarrier symbol being preceded by a guard interval, comprising the following steps:
  eliminating said guard interval, delivering said modulated signal,
  demodulating said modulated signal, comprising a filtering by at least one prototype function implementing at least two distinct filtering coefficients.

Such a receiving method is adapted to receiving a multicarrier signal transmitted according to the above-described transmission method.

In particular, owing to the insertion of a guard interval before certain multicarrier symbols, the received signal has less inter-symbol interference. Consequently, even at high signal-to-noise ratios, high performance is obtained.

According to one particular embodiment, the multicarrier signals comprise preamble symbols and payload symbols and the method comprises the following steps:
  extracting said preamble symbols prior to said step for eliminating a guard interval,
  estimating a transmission channel of said multicarrier signal from said preamble symbols,
  equalizing said modulated signal, prior to said demodulation step, taking into account said transmission channel estimation.

Owing to the extraction of the preamble symbols prior to the elimination of the guard interval, the channel estimation can apply a classic technique adapted to advanced modulations such as the technique of estimation by pairs of pilots for an OFDM/OQAM modulation described in the patent applications WO2008/007019 and WO2008/007030 filed on behalf of the present Applicant.

In addition, the equalization of the modulated signal is done before the demodulation step. It is thus possible to implement a one-coefficient ZF (zero-forcing) type equalization that simplifies the equalization step. In addition, the introduction of a guard interval in transmission mode gives a good performance through the use of a one-coefficient ZF type equalization.

In particular, the method of the disclosure can carry out a space/time decoding step applying a processing in reverse to a space/time encoding performed when transmitting, for example based on an Alamouti type encoding scheme.

In another embodiment, the disclosure concerns a device for receiving a multicarrier signal formed by a temporal succession of multicarrier symbols, at least one multicarrier symbol being preceded by a guard interval, comprising:

means for eliminating said guard interval, delivering said modulated signal, means for demodulating said modulated signal, comprising a filtering by at least one prototype function implementing at least two distinct filtering coefficients.

Such a receiver device may especially be adapted to implementing the method for receiving described here above. It is for example a terminal of the radiotelephone, laptop, PDA (Personal Digital Assistant), or digital video broadcast network retransmitter type.

Another aspect of the disclosure relates to a computer program product downloadable from a communications network and/or recorded on a computer-readable carrier and/or executable by a processor, comprising program code instructions for implementing the transmission and/or reception method described here above.

Yet another aspect of the disclosure relates to a multicarrier signal formed by a temporal succession of multicarrier symbols, obtained after a step for modulating data symbols representing a data signal to be transmitted, comprising a filtering by at least one prototype function implementing at least two distinct filtering coefficients.

According to the disclosure, at least one of the multicarrier symbols of the multicarrier signal is preceded by a guard interval.

It can be noted that such a multicarrier signal is different from a classic OFDM signal. Indeed, owing to the use of at least one prototype function which may be distinct from the rectangular function, the signal which is obtained shows overlapping. In other words, the multicarrier symbols can overlap each other at least partially.

Such a signal can especially be sent according to the method of transmission described here above. This signal can of course include the different characteristics pertaining to the method of transmission according to the disclosure.

In particular, the multicarrier symbols can include preamble symbols and payload symbols, and only at least one of the payload symbols is preceded by a guard interval in the multicarrier signal.

BRIEF DESCRIPTION OF THE DRAWINGS

Other features and advantages of the disclosure shall more clearly appear from the following description of a particular embodiment, given by way of an indicative and non-exhaustive example, and from the appended drawings, of which.

DETAILED DESCRIPTION OF ILLUSTRATIVE EMBODIMENTS

1. General Principle

The general principle of the disclosure relies on the insertion of a guard interval of the time domain into a multiple-carrier signal modulated according to the advanced modulation which is distinct from the classic OFDM. For example, the multicarrier signal of the disclosure is of the OFDM/OQAM, BFDM/OQAM, oversampled OFDM, oversampled BFDM, FMT, or other type.

In particular, these modulations known as advanced modulations implement a polyphase filtering using at least two distinct filtering coefficients, i.e. the prototype function g is different from the rectangular waveform. Owing to the use of a prototype function having a duration which may be greater than the time of one data symbol, the multicarrier symbols of the modulated signal can overlap one another at least partially. In other words, the multicarrier signals are generally not independent in terms of time slots.

Figure 1:
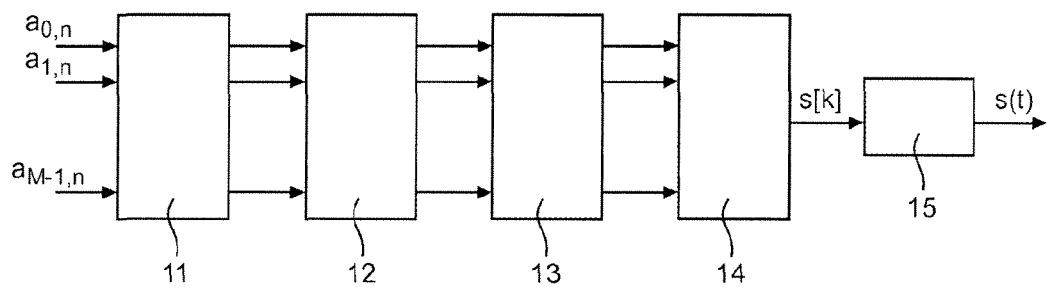
FIG. 1, already commented on with reference to the prior art, presents a classic OFDM/OQAM modulation sequence.
Figure 2:
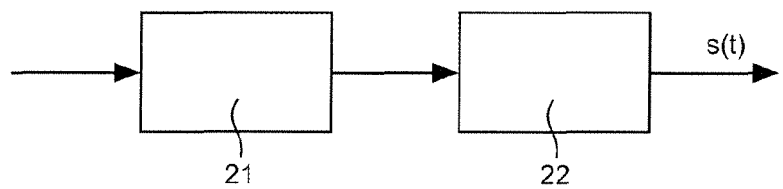
FIG. 2 illustrates the main steps of the transmitting scheme according to the disclosure.

Referring to FIG. 2, one presents the main steps of the transmission method according to the disclosure.

During a modulation step 21, the data symbols representing a data signal to be transmitted are modulated. These data symbols may be payload data or reference data also known as pilots. They may have a complex value ($c_{m,n}$) for an oversampled OFDM or oversampled BFDM modulation, or may have a real value ($a_{m,n}$) for an OFDM/OQAM or BFDM/OQAM modulation.

The modulation step 21 comprises a filtering by at least one prototype function implementing at least two distinct filtering coefficients, and delivers a modulated signal constituted by a temporal succession of multicarrier symbols.

This modulation step is described more specifically with reference to the prior art.

During a following step 22, a guard interval is inserted into the time domain before at least one multicarrier symbol of the modulated signal, delivering the multicarrier signal s(t). In other words, the guard interval is inserted between two multicarrier symbols of the modulated signal.

For example, the guard interval inserted before a multicarrier symbol can consist of temporal samples of zero value or a copy of the last temporal samples of the multicarrier signal. In the latter case, the guard interval is also known as a cyclic prefix.

The value of a cyclic prefix is that it gives a product of circular convolution with the channel, resulting in a multiplication by a diagonal matrix in the frequency domain.

The insertion of a guard interval of this kind can provide for separation between the different multicarrier symbols.

In particular, it can have a length smaller than or equal to the maximum delay spread in the transmission channel.

The signal s(t) is then conveyed in a transmission channel.

Figure 3:
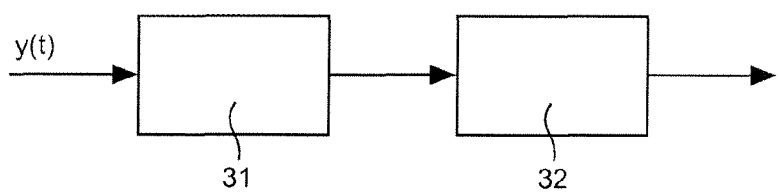
FIG. 3 illustrates the main steps of the receiving scheme according to the disclosure.

FIG. 3 illustrates the main steps of the method for receiving a multicarrier signal formed by a temporal succession of multicarrier symbols in which at least one multicarrier symbol is preceded by a guard interval.

During a first step 31, the guard interval or intervals inserted into the multicarrier signal are eliminated. Thus, the modulated signal is retrieved.

In a following step 32, the modulated signal is demodulated. This demodulation step 32 is not novel per se. It comprises one filtering operation using at least one prototype function implementing at least two distinct filtering coefficients and gives an estimation of the data symbols denoted as $\hat{a}_{m,n}$ for an OFDM/OQAM or BFDM/OQAM type modulation, or $\hat{c}_{m,n}$ for an oversampled OFDM modulation or an oversampled BFDM modulation for example.

The modulated signal can be equalized before demodulation. To this end, the operation passes from the time domain to the frequency domain after the step 31 which eliminates the guard interval by performing a fast Fourier transform. The signal in the frequency domain is then equalized to compensate for the distortions of the channel and then returned to the time domain by means of an inverse fast Fourier transform. The equalized signal in the time domain, considered without distortion, is then transmitted to the demodulator 32 in order to estimate the transmitted data.

It can be noted that the transmission and/or reception methods according to the disclosure can be implemented in various ways, especially in a wired form or in a software form.

2. Description of a Particular Embodiment

Here below, one describes a particular embodiment of the disclosure in which the modulation step implements an OFDM/OQAM type modulation. Naturally, other modulations can be used such as the BFDM/OQAM, oversampled OFDM, or else oversampled BFDM modulations.

Figure 4:
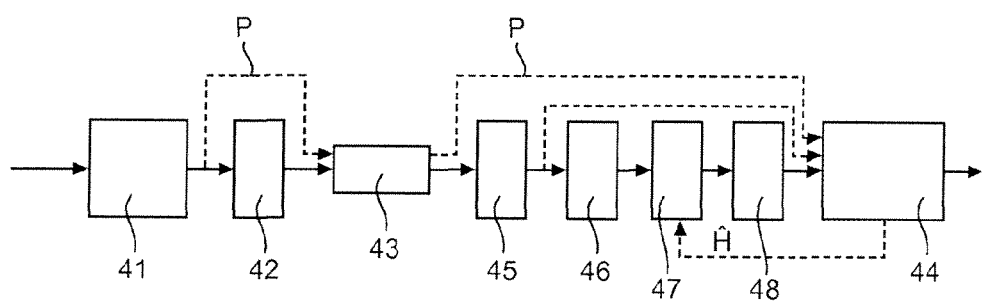
FIG. 4 presents a transmission chain according to a first embodiment of the disclosure.

FIG. 4 illustrates a transmission sequence according to this example.

More specifically, at output of a modulation block 41, the modulated signal is an OFDM/OQAM signal consisting of a time sequence of multicarrier symbols. Each multicarrier symbol is formed by a set of subcarriers each modulating one data symbol, a data symbol corresponding to pieces of payload data, or to pieces of reference data also called pilots. The channel is considered to be flat on each subcarrier. Owing to the modulation used (distinct from the classic OFDM modulation), the multicarrier symbols are generally not independent in terms of time slots.

In particular, the pilots may be distributed in the time-frequency plane according to a regular pattern. They may be used to estimate the transmission channel by measuring a subsampled version of the channel (known as "scattered pilots"). Then, a 2D interpolation is performed to determine the value of the channel at all points of the time-frequency network. This method is used for example by the DVB-T standard.

If the transmission channel is known beforehand, the insertion of pilots is not necessary and the multicarrier symbols comprise only data symbols corresponding to payload data.

According to one variant, at least one multicarrier signal consists of a set of subcarriers each modulating a pilot. Thus, these preamble multicarrier symbols comprise only pilots, whereas the payload multicarrier symbols comprise payload data and, as the case may be, pilots when pilots are distributed in the time/frequency plane.

The preamble symbols are placed at the start of a frame. Through these preamble symbols, the transmission channel is estimated on each of the carriers of the multiplex. The parameters of the system (symbol duration, frame length etc) ensure that the channel will vary slowly relative to the symbol time. They are assumed to be quasi-constant on a frame. It is then possible to use the estimation of the channel on the preamble symbols for all the multicarrier symbols of the frame. This type of estimation is valid for the wire transmission (DSL, PLC) and also for the WLAN (IEEE802.11a/g) or WRAN (IEEE802.22) type wireless channels.

It can be noted that these preamble symbols can be inserted into the signal before the modulation step or else at the output of the modulation step.

As in classic OFDM, the temporal samples corresponding to the preamble symbols and to the payload symbols can be transmitted before the step of insertion of a guard interval 42. In this case, the estimation of the transmission signal at reception is done according to the classic OFDM principle.

However, estimation techniques specific to advanced modulations have been developed, making it possible to obtain a better channel estimation than the one obtained by following the classic OFDM principle.

These techniques known as IAM (Interference Approximation Method) techniques are described especially in the patent applications WO2008/007019 and WO2008/007030 mentioned hereabove. These techniques provide for a better estimation of the transmission channel from the preamble symbols.

Thus, according to this embodiment of the disclosure, a guard interval 42 is inserted only before the payload symbols. Thus, the preamble symbols P, represented in dashes in FIG. 4, travel directly through the transmission channel 43 according to a classic OFDM/OQAM mode, i.e. without any guard intervals. This enables a channel estimation to be done at reception with the OFDM/OQAM technique.

In other words, the temporal samples corresponding to the payload symbols are separated from and the temporal samples corresponding to the preamble symbols. The temporal samples corresponding to the preamble symbols are transmitted according to the classic OFDM/OQAM mode, i.e. without any addition of a guard interval, whereas the temporal samples corresponding to the payload symbols follow the OFDM/OQAM transmission mode with guard interval.

Figure 5:
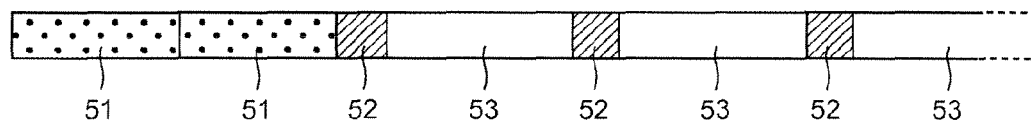
FIG. 5 illustrates the structure of a multicarrier signal according to the embodiment of FIG. 4.

FIG. 5 illustrates an example of a frame of the multicarrier signal transmitted according to this particular embodiment of the disclosure. Such a frame comprises one or more preamble symbols (for example two preamble symbols 51), and payload symbols 53. These payload symbols 53 are each preceded by a guard interval 52.

Thus:

at an instant t, the first preamble symbol 51 is transmitted, then at an instant $t+T_0$, the second preamble symbol 51 is transmitted, at an instant t+2T$_0$, the first payload symbol 53 accompanied by the guard interval 51 is transmitted, then at an instant t+3T$_0$, the second payload symbol 53 accompanied by the guard interval 52 is transmitted, etc.

Such an approach allows, firstly, to keep the gain of the OFDM/OQAM channel estimation, secondly, to transmit data with guard intervals for a greater resistance to channel spread.

After passing through the transmission channel 43, the temporal samples corresponding to the preamble symbols P of the multicarrier signal are directly transmitted to a demodulator 44 to estimate the transmission channel.

The channel estimation through the preamble symbols combines the technique known as IAM which consists of the constructive use of the inter-symbol interference (IES) generated by the OFDM/OQAM and the estimation by pairs of pilots having real and/or imaginary values as described in the patent applications WO2008/007019 and WO2008/007030 mentioned here above.

After elimination of a guard interval 45, the temporal samples corresponding to the payload symbols (payload data symbols and possibly pilot data symbols) are equalized by implementing a fast Fourier transform (FFT) 46, and then an equalization 47, taking into account the estimation of the transmission channel Ĥ, then an inverse FFT 48 before entering the demodulator 44. The one-coefficient equalization and the channel estimation are therefore performed separately in the frequency domain.

In particular, if the payload symbols comprise pilots, the temporal samples corresponding to the payload symbols are transmitted to the demodulator 44 to obtain a second channel estimation before the FFT step 46, equalization step 47 and inverse FFT step 48.

For example, this channel estimation implements the ring technique as described in the patent application EP 1 319 293

The demodulator 44 makes it possible especially to estimate the transmitted data.

Thus, in this embodiment, the working of the demodulator 44 is classic but the equalization, which is left to be of the ZF type with one coefficient per subcarrier, is done before the demodulation 44.

To obtain higher performance in the case of an estimation by preamble, it is preferable to use a prototype filter having a length limited to T$_0$. For lengthier prototypes, the preamble can be prolonged by as many zeros as necessary (i.e. by zero multicarrier symbols).

Another possibility is that of adding the preamble symbols at output of the modulator. In this case, the preamble symbols and the payload symbols are processed in the same way, i.e. a guard interval is inserted before each multicarrier symbol, whether it is a preamble symbol or a payload symbol.

3. Applications to Multi-Antenna Systems

Figure 6:
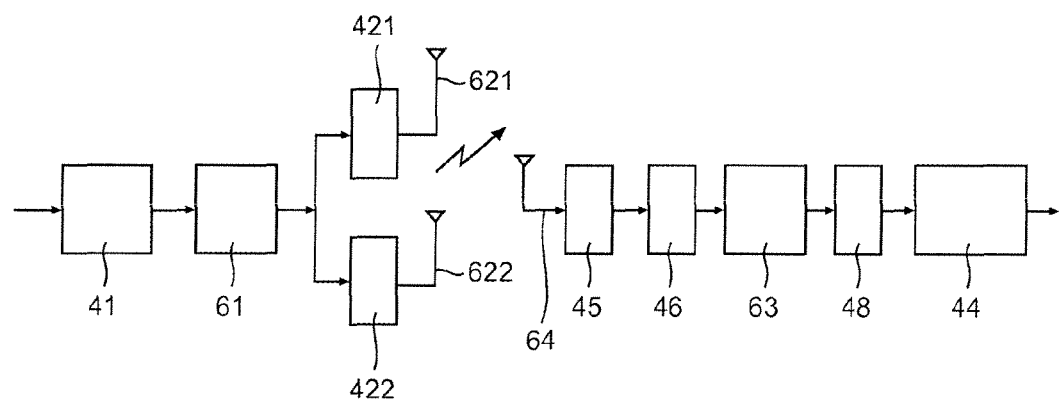
FIG. 6 illustrates a transmission chain according to a second embodiment of the disclosure.

FIG. 6 illustrates an application of the technique of the disclosure to the multi-antenna systems. Indeed, the use of a guard interval eliminates or at least reduces the inter-symbol interference and may therefore be extended to the multiple-antenna systems.

In this case, a step for inserting a guard interval 421, 422 is implemented for each of transmitting antennas 621, 622.

The multi-antenna system illustrated in FIG. 6 has two transmitting antennas 621 and 622, and one receiving antenna 64. Naturally, the disclosure can be applied to a different number of antennas and especially to a system comprising two transmitting antennas and two receiving antennas.

More specifically, after the modulation step 41, the modulated signal undergoes a space/time encoding 61 which distributes the multicarrier symbols of the modulated signal among the different transmitting antennas 621 and 622. Such an encoding especially improves transmission robustness.

In the context of an advanced OFDM/OQAM type modulation for example, the condition of orthogonality is verified only in the field of the real values, and this does not enable the use of the classic Alamouti encoding scheme.

The disclosure therefore proposes to apply the space/time encoding at output of the modulation step 41 so as to work on complex values.

For example, the space/time encoding step implements an encoding matrix based on an Alamouti type encoding scheme, such that:

$$S = \begin{bmatrix} s_1 & s_2 \\ s_1' & s_2' \end{bmatrix}$$

where: $s_1$ and $s_2$ are the symbol vectors corresponding to the temporal samples transmitted at the instant T$_0$ on a first transmitting antenna 621 and a second transmitting antenna 622 respectively;

$s_1'$ and $s_2'$ are symbol vectors corresponding to the temporal samples transmitted at the instant 2T$_0$ on a first transmitting antenna 621 and the second transmitting antenna 622 respectively, with:

$s_1'[k]=s_2^*[M-1-k]$;

$s_2'[k]=-s_1^*[M-1-k]$.

This encoding scheme makes it possible to meet the conditions of orthogonality, i.e. it makes possible to maintain the distances between the multicarrier symbols transmitted, thus optimizing performance.

In a first embodiment, the temporal samples corresponding to the payload symbols and the temporal samples corresponding to the preamble symbols, if they exist, undergo the same processing. In other words, a guard interval is inserted before these multicarrier symbols before transmission, whether it is preamble symbols or payload symbols.

In particular, to obtain better performance in the case of an estimation by preamble, it is preferable to use a prototype filter with a length limited to $$\frac{3}{2}T_0.$$

For longer prototypes, the preamble can be extended by as many zeroes as necessary (i.e. by null multicarrier symbols).

According to a second embodiment, the preamble symbols are inserted after the modulator 41, after the space/time encoding 61. In this case, the preamble symbols and the payload symbols are processed in the same way, i.e. a guard interval is inserted before each multicarrier symbol, whether it is a preamble symbol or a payload symbol. Owing to the presence of two transmitting antennas 621 and 622, two transmission channels have to be estimated and it is therefore desirable to double the duration of the preambles. In particular, owing to the lengthening of the duration of the preamble, there are constraints on the length of the prototype which is used.

Figure 7:
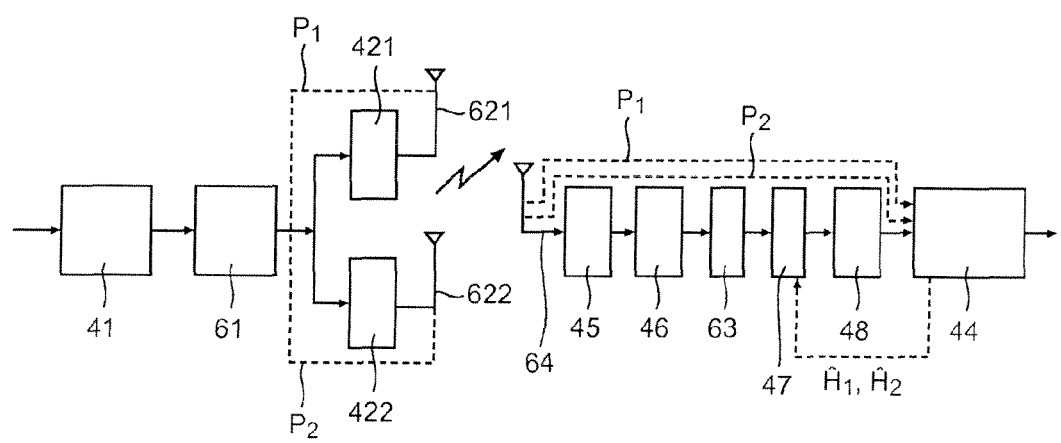
FIG. 7 presents a transmission system combining the first and second embodiments.

In a third example, illustrated in FIG. 7, the temporal samples corresponding to the payload symbol are separated from the temporal samples corresponding to the preamble symbols. Owing to the presence of two transmission channels, it is desirable to double the duration of the preamble. The symbols of the preamble are therefore distributed into two subsets $P_1$ and $P_2$ during the space/time encoding step 61.

The temporal samples corresponding to the preamble symbols $P_1$ and $P_2$, shown in dashes in FIG. 7, are transmitted without adding any guard interval whereas the temporal samples corresponding to the payload symbols are transmitted with a guard interval.

Again, to obtain the best performance in the case of an estimation by preamble, it is preferable to use a prototype filter with a length limited to $T_0$. For lengthier prototypes, the preamble can be extended by as many zeroes as necessary (i.e. by null multicarrier symbols).

On the reception side, the steps previously described with reference to FIG. 4 are implemented:
  elimination 45 of the guard interval;
  demodulation 44 of the modulated signal.

Before demodulation 44, the signal is demodulated in a space/time decoding module 63 implementing a processing in reverse to a space/time encoding performed when transmitting.

If the channel is not perfect, the preamble symbols may be used to estimate the transmission channels $\hat{H}_1$ and $\hat{H}_2$, corresponding to the transmission channel between the first transmitting antenna 621 and the receiving antenna 64 and to the transmission channel between the second transmitting antenna 622 and the receiving antenna 64.

Thus, according to the third example illustrated in FIG. 7, after passing through the transmission channels, the temporal samples corresponding to the preamble symbols $P_1$ and $P_2$ of the multicarrier signal are directly transmitted to the demodulator 44 for a channel estimation.

After elimination of the guard interval 45, the temporal samples corresponding to the payload symbols (payload data symbols and possibly pilots) are equalized 47 in taking into account the estimation of the transmission channels $\hat{H}_1$ and $\hat{H}_2$.

Thus, if the modulator 41 implements an advanced OFDM/OQAM type modulation, the expected gain is the one related to the channel estimation method used for OFDM/OQAM.

4. Performance of the Disclosure

Figure 8:
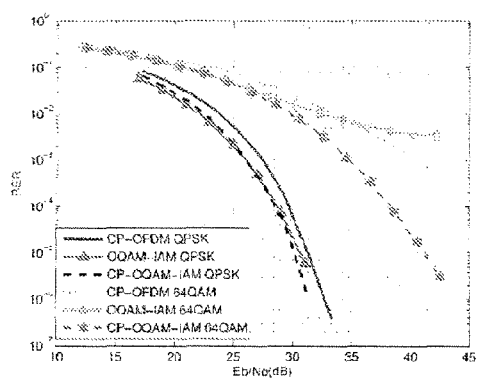
FIGS. 8 and 9 illustrate the performance characteristics of the disclosure relative to the prior art.
Figure 9:
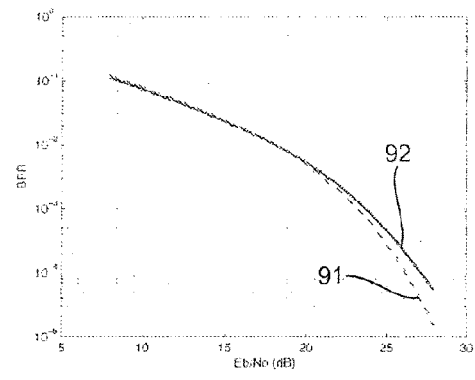

Referring now to FIGS. 8 and 9, one presents the performance of the disclosure as compared with the prior art in a SISO system (FIG. 8) or MISO (FIG. 9). These curves illustrate the bit error rate (BER) as a function of the Eb/N0 ratio in dB.

More specifically, one considers the PLC Zimmermann channel and a perfect estimation of the transmission channel to compare the approach of the disclosure, based on an OFDM/OQAM modulation with the prior art solutions, i.e. the classic OFDM with guard interval.

The simulation parameters are:
  sampling frequency: 10 MHz, FFT size 128, length of the guard interval: 10 samples (1 µs);
  constellation: QPSK or 64-QAM;
  linear amplitude profile: 0:2, 0:1, 0:02, 0:01;
  delay spread (µs): 0, 0:4, 0:6, 0:7;
  for the OFDM/OQAM modulation, the prototype function is the OptLoc function whose duration is limited here to $T_0$.

In a perfect estimation, the performances of the technique of the disclosure and of the classic OFDM technique with guard interval are the same, both techniques using a guard interval of the same length.

By contrast, as illustrated in FIG. 8, the variant of the disclosure in which a guard interval is inserted before the payload symbols only, denoted as CP-OQAM-IAM (QPSK or 64 QAM depending on the constellation used) gives better performance than the classic OFDM technique with a guard interval denoted as CP-OFDM (QPSK or 64 QAM depending on the constellation used), through the gain obtained by the estimation method adapted to the OFDM/OQAM modulation.

Furthermore, the CP-OQAM-IAM technique eliminates the level problem present in the OQAM-IAM (QPSK or 64 QAM depending on the constellation used) corresponding to the classic OFDM/OQAM techniques without a guard interval.

Performance is also improved in the context of a multi-antenna system implementing two transmitting antennas and only one receiving antenna, as illustrated in FIG. 9.

For example, again assuming having a perfect knowledge of the channel, and simulation parameters similar to the previous ones except for the following:
  length of guard interval equal to the size of the FFT divided by 4;
  constellation: QPSK;
  amplitude profile of the first transmission channel, corresponding to the channel between the first transmitting antenna and the receiving antenna, in linear terms: 0:2, 0:1, 0:02, 0:01;
  delay spread of first channel (µs): 0, 0:4, 0:6, 0:7;
  amplitude profile of the second transmission channel, corresponding to the channel between the second transmitting antenna and the receiving antenna, in linear terms: 0:5, 0:2,0:3,0:1,0:02;
  delay spread for the second channel (µs): 0, 0:4, 0:6, 0:9, 1:1;
  for the OFDM/OQAM modulation, the prototype function is the IOTA function of a length $4T_0$;

it is noted that the technique of the disclosure in OFDM/OQAM mode implementing an Alamouti encoding type scheme, represented in a curve 91, performs better than the prior art technique in OFDM mode implementing a classic Alamouti encoding scheme represented in a curve 92, with assumptions similar to those for OFDM, i.e. a channel that is flat over a symbol time.

The disclosure thus proposes a novel technique of modulation distinct from the classic OFDM technique with a guard interval, used to limit inter-symbol interference. Thus, the technique proposed may be used in DVB broadcasting networks especially for the SFN broadcasting mode according to which the delays introduced by the channel are very high.

The disclosure thus makes it possible, in at least one of its embodiments, to:
  preserve the gain of the more advanced modulations over the classic OFDM modulations, including for the high values of SNR, through the addition of a guard interval in the transmitting mode;
  improve performance by combining the channel estimation techniques of the advanced modulations, and using guard interval, with an appropriate implementation of the receiver;
  implement an Alamouti sequence 2×1 (MISO) with an advanced modulator such as an OFDM/OQAM modulator or a BFDM/OQAM modulator.

5. Structure of the Transmitting and Receiving Devices

Figure 10:
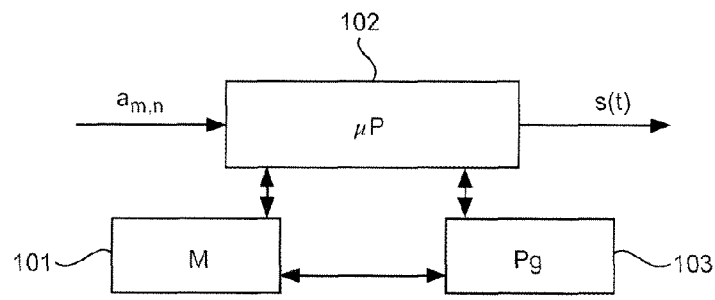
FIGS. 10 and 11 present the structures of a transmitting structure and a receiving structure implementing the transmission and reception techniques according to one particular embodiment of the disclosure.
Figure 11:
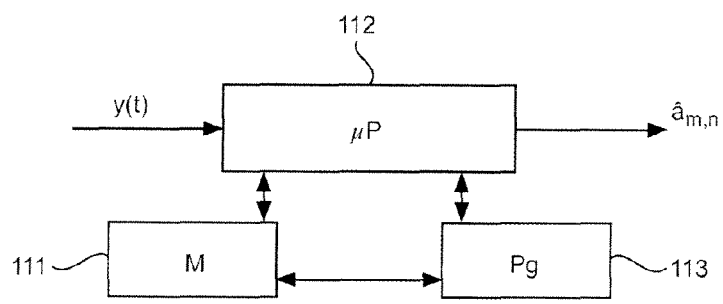

Referring finally to FIGS. 10 and 11, one presents the simplified structure of a transmitting device and a receiving device respectively implementing a transmission technique and a reception technique according to the particular embodiment described here above.

Such a transmitting device comprises a memory 101 constituted by a buffer memory, a processing unit 102 equipped for example with a microprocessor μP and driven by a computer program 103 implementing the transmission method according to the disclosure.

At initialization, the code instructions of the computer program 103 are loaded for example into a RAM and then executed by the microprocessor of the processing unit 102. At an input, the processing unit 102 receives real-value or complex-value data symbols. The microprocessor of the processing unit 102 implements the steps of the transmission method described earlier, according to the instructions of the computer program 103, to generate the multicarrier signal s(t). To this end, the transmitting device comprises, in addition to the buffer memory 101, means for modulating data symbols and means for inserting a guard interval before at least one multicarrier symbol of the modulated signal. These means are driven by the microprocessor of the processing unit 102.

The receiving device comprises a memory 111 constituted by a buffer memory, a processing unit 112 equipped for example with a microprocessor μP and driven by a computer program 113 implementing the receiving method according to the disclosure.

At initialization, code instructions of the computer program 113 are loaded for example into a RAM and then executed by the processor of the processing unit 112. At an input, the processing unit 112 receives a signal y(t), corresponding to the multicarrier signal s(t) after passage into the transmission channel. This signal y(t) is formed by a temporal succession of multicarrier symbols, at least one multicarrier symbol being preceded by a guard interval. The microprocessor of the processing unit 112 implements the steps of the receiving method described here, according to the instructions of the computer program 113, to estimate the data transmitted. To this end, the receiving device comprises, in addition to the buffer memory 111, means for eliminating said guard interval, delivering said modulated signal, and means for demodulating said modulated signal. These means are driven by the microprocessor of the processing unit 112.

Although the present disclosure has been described with reference to one or more examples, workers skilled in the art will recognize that changes may be made in form and detail without departing from the scope of the disclosure and/or the appended claims.

The invention claimed is:

1. A transmission method for transmitting a multicarrier signal, wherein the method comprises:
modulating, with a device, data symbols representing a data signal to be transmitted, comprising filtering by at least one prototype function implementing at least two distinct filtering coefficients, delivering a modulated signal constituted by a temporal succession of multicarrier symbols, wherein said multicarrier symbols comprise preamble symbols constituted by pilots having at least one of a value or a location when transmitting which are known to at least one receiver intended for receiving said multicarrier signal, and payload symbols; and
inserting a guard interval solely before at least one of the payload symbols of said modulated signal, delivering said multicarrier signal.

2. The transmission method according to claim 1, wherein said guard interval has a length smaller than or equal to a delay spread in a transmission channel of said multicarrier signal.

3. The transmission method according to claim a 1, wherein said preamble symbols are transmitted prior to said guard interval and said payload symbols.

4. The transmission method according to claim 1, wherein the method implements at least two transmitting antennas and the step of inserting a guard interval is implemented for each of said transmitting antennas.

5. The transmission method according to claim 4, wherein the method comprises a step of space/time encoding applied to said modulated signal, implementing an encoding matrix based on an Alamouti type encoding scheme, such that:

$$S = \begin{bmatrix} s_1 & s_2 \\ s_1' & s_2' \end{bmatrix}$$

where: $s_1$ and $s_2$ are symbol vectors corresponding to temporal samples transmitted at an instant t on a first transmitting antenna and a second transmitting antenna respectively;
$s_1'$ and $s_2'$ are symbol vectors corresponding to temporal samples transmitted at an instant $t+T_s$ on the first and second transmitting antennas respectively, with:
$s_1'[k]=s_2^*[M-1-k]$;
$s_2'[k]=-s_1^*[M-1-k]$;
M is the number of carriers of a multicarrier symbol of the multicarrier signal;
$T_s$ is the duration of a multicarrier symbol of the multicarrier signal;
k is the index of the temporal sample; and
* is the conjugate transpose operator.

6. A computer program product recorded on a non-transitory computer-readable carrier and executable by a processor, wherein the product comprises program code instructions for implementing a method for transmitting a multicarrier signal, wherein the method comprises:
modulating data symbols representing a data signal to be transmitted, comprising filtering by at least one prototype function implementing at least two distinct filtering coefficients, delivering a modulated signal constituted by a temporal succession of multicarrier symbols, wherein said multicarrier symbols comprise preamble symbols constituted by pilots having at least one of a value or a location when transmitting which are known to at least one receiver intended for receiving said multicarrier signal, and payload symbols, and
inserting a guard interval solely before at least one of the payload symbols of said modulated signal, delivering said multicarrier signal.

7. A transmitting device for transmitting a multicarrier signal, comprising:
means for modulating data symbols representing a data signal to be transmitted, comprising filtering by at least one prototype function implementing at least two distinct filtering coefficients, delivering a modulated signal constituted by a temporal succession of multicarrier symbols, wherein said multicarrier symbols comprise preamble symbols constituted by pilots having at least one of a value or a location when transmitting which are known to at least one receiver intended for receiving said multicarrier signal, and payload symbols, and
means for inserting a guard interval solely before at least one of the payload symbols of said modulated signal, delivering said multicarrier signal.

8. A receiving method comprising:
receiving, with a device, a multicarrier signal formed by a temporal succession of multicarrier symbols, at least one multicarrier symbol being preceded by a guard interval, wherein said multicarrier symbols comprise preamble symbols constituted by pilots having at least one of a value or a location when transmitting which are known to at least one receiver implementing said method, and payload symbols, eliminating said guard interval, delivering said modulated signal, demodulating said modulated signal, comprising filtering by at least one prototype function implementing at least two distinct filtering coefficients, extracting said preamble symbols prior to eliminating a guard interval, estimating a transmission channel of said multicarrier signal from said preamble symbols, and equalizing said modulated signal, prior to said demodulation step, taking into account said transmission channel estimation.

9. The receiving method according to claim 8, wherein the method implements a space/time decoding step applying a processing in reverse to a space/time encoding performed when transmitting.

10. A computer program product recorded on a non-transitory computer-readable carrier and executable by a processor, wherein the product comprises program code instructions for implementing a method comprising:

receiving a multicarrier signal formed by a temporal succession of multicarrier symbols, at least one multicarrier symbol being preceded by a guard interval, wherein said multicarrier symbols comprise preamble symbols constituted by pilots having at least one of a value or a location when transmitting which are known to at least one receiver implementing said method, and payload symbols, eliminating said guard interval, delivering said modulated signal, demodulating said modulated signal, comprising filtering by at least one prototype function implementing at least two distinct filtering coefficients, extracting said preamble symbols prior to eliminating a guard interval, estimating a transmission channel of said multicarrier signal from said preamble symbols, and equalizing said modulated signal, prior to said demodulation step, taking into account said transmission channel estimation.

11. A device for receiving a multicarrier signal formed by a temporal succession of multicarrier symbols, at least one multicarrier symbol being preceded by a guard interval, wherein said multicarrier symbols comprise preamble symbols constituted by pilots having at least one of a value or a location when transmitting which are known to at least one receiver implementing said method, and payload symbols, and wherein the device comprises:

means for eliminating said guard interval, delivering said modulated signal, and means for demodulating said modulated signal, comprising filtering by at least one prototype function implementing at least two distinct filtering coefficients, means for extracting said preamble symbols prior to eliminating a guard interval, means for estimating a transmission channel of said multicarrier signal from said preamble symbols, and means for equalizing said modulated signal, prior to demodulating, taking into account said transmission channel estimation.

12. A transmission method for transmitting a multicarrier signal, wherein the method comprises:

modulating, with a device, data symbols representing a data signal to be transmitted, comprising filtering by at least one prototype function implementing at least two distinct filtering coefficients, delivering a modulated signal constituted by a temporal succession of multicarrier symbols;

inserting a guard interval before at least one multicarrier symbol of said modulated signal, delivering said multicarrier signal; and space/time encoding said modulated signal, implementing an encoding matrix based on an Alamouti type encoding scheme, such that:

$$S = \begin{bmatrix} s_1 & s_2 \\ s_1' & s_2' \end{bmatrix}$$

where: $s_1$ and $s_2$ are symbol vectors corresponding to temporal samples transmitted at an instant t on a first transmitting antenna and a second transmitting antenna respectively; $s_1'$ and $s_2'$ are symbol vectors corresponding to temporal samples transmitted at an instant $t+T_s$ on the first and second transmitting antennas respectively, with:

$s_1'[k]=s_2^*[M-1k]$;
$s_2'[k]=-s_1^*[M-1k]$;

M is the number of carriers of a multicarrier symbol of the multicarrier signal;

$T_s$ is the duration of a multicarrier symbol of the multicarrier signal;

k is the index of the temporal sample; and

* is the conjugate transpose operator.

* * * * *

UNITED STATES PATENT AND TRADEMARK OFFICE
CERTIFICATE OF CORRECTION

| | |
|---|---|
| PATENT NO. | : 8,743,978 B2 |
| APPLICATION NO. | : 12/920206 |
| DATED | : June 3, 2014 |
| INVENTOR(S) | : Siohan et al. |

Page 1 of 1

It is certified that error appears in the above-identified patent and that said Letters Patent is hereby corrected as shown below:

In the claims

Claim 3, col. 15, line 65 delete "according to claim a 1"

and replace with

--according to claim 1--.

Signed and Sealed this
Ninth Day of February, 2016

Michelle K. Lee
*Director of the United States Patent and Trademark Office*